US005131761A

United States Patent [19]

Bury

[11] Patent Number: 5,131,761
[45] Date of Patent: Jul. 21, 1992

[54] LINEAR GUIDING APPARATUS

[75] Inventor: James Bury, Allestree, United Kingdom

[73] Assignee: LK Limited, Great Britain

[21] Appl. No.: 576,513

[22] PCT Filed: Apr. 5, 1989

[86] PCT No.: PCT/GB89/00349
§ 371 Date: Oct. 8, 1990
§ 102(e) Date: Oct. 5, 1990

[87] PCT Pub. No.: WO89/09887
PCT Pub. Date: Oct. 19, 1989

[51] Int. Cl.⁵ ............................................ F16C 29/02
[52] U.S. Cl. ........................................ 384/41; 384/37; 384/38
[58] Field of Search ................ 384/41, 38, 37, 42, 384/40

[56] References Cited

U.S. PATENT DOCUMENTS 2,631,067 3/1953 Arms et al. .

FOREIGN PATENT DOCUMENTS 2504183 12/1975 Fed. Rep. of Germany .
1536435 8/1968 France .

Primary Examiner—Lenard A. Footland
Attorney, Agent, or Firm—Thomas M. Farrell

[57] ABSTRACT

In a co-ordinate measuring machine, a linear guideway comprises two tubular guides 14, 16 mounted on a column 10 in a parallel spaced apart relation and extending in a direction parallel to the longitudinal axis of the column 10. The guides 14, 16 are mounted on the column 10 by a plurality of elongate bars 20 formed for example of carbon fibre. The bars 20 are so designed as to allow change in relative length between the guide 14 and the column 10 but to retain the guide 14 in a rigid relation to the column 10 in a direction along the axis of each of the bars 20. The guide 16 is mounted on the column 10 by a plurality of pairs of bars 50 similar to the bars 20. Each of the guides 14, 16 is anchored relative to the column 10 at one respective end. A carriage 12 is slidably mounted on the guides 14, 16 by suitable bearings and requires five degrees of restraint and one degree of freedom in the axial direction of the guides 14, 16. The guide 16 offers two degrees of restraint and the guide 14 offers one degree of restraint but, in conjunction with the guide 16 controls rotation about the axis of the latter. A bearing arrangement controls rotation about the other two axes making five restraints in total.

17 Claims, 10 Drawing Sheets

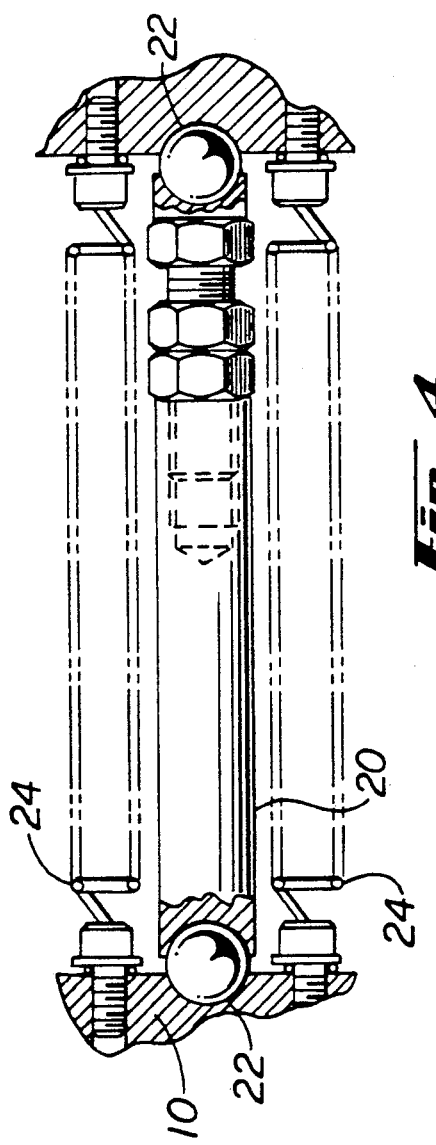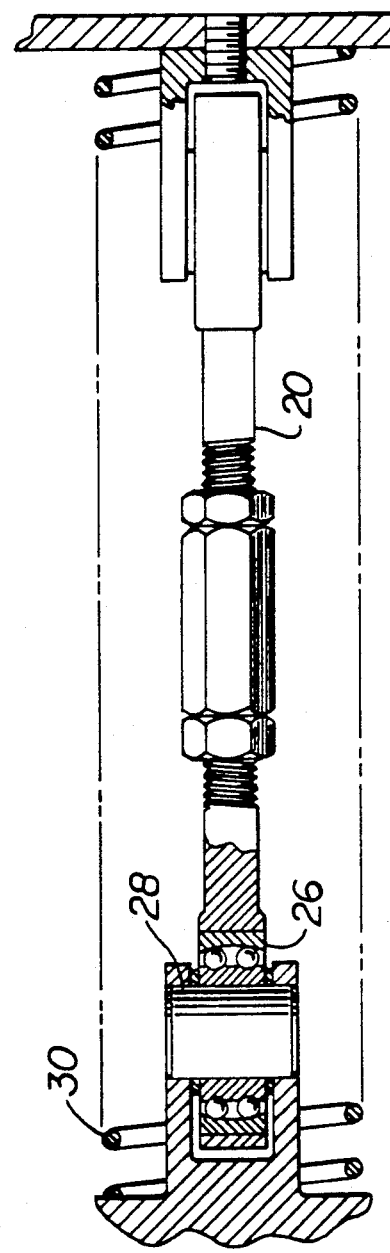

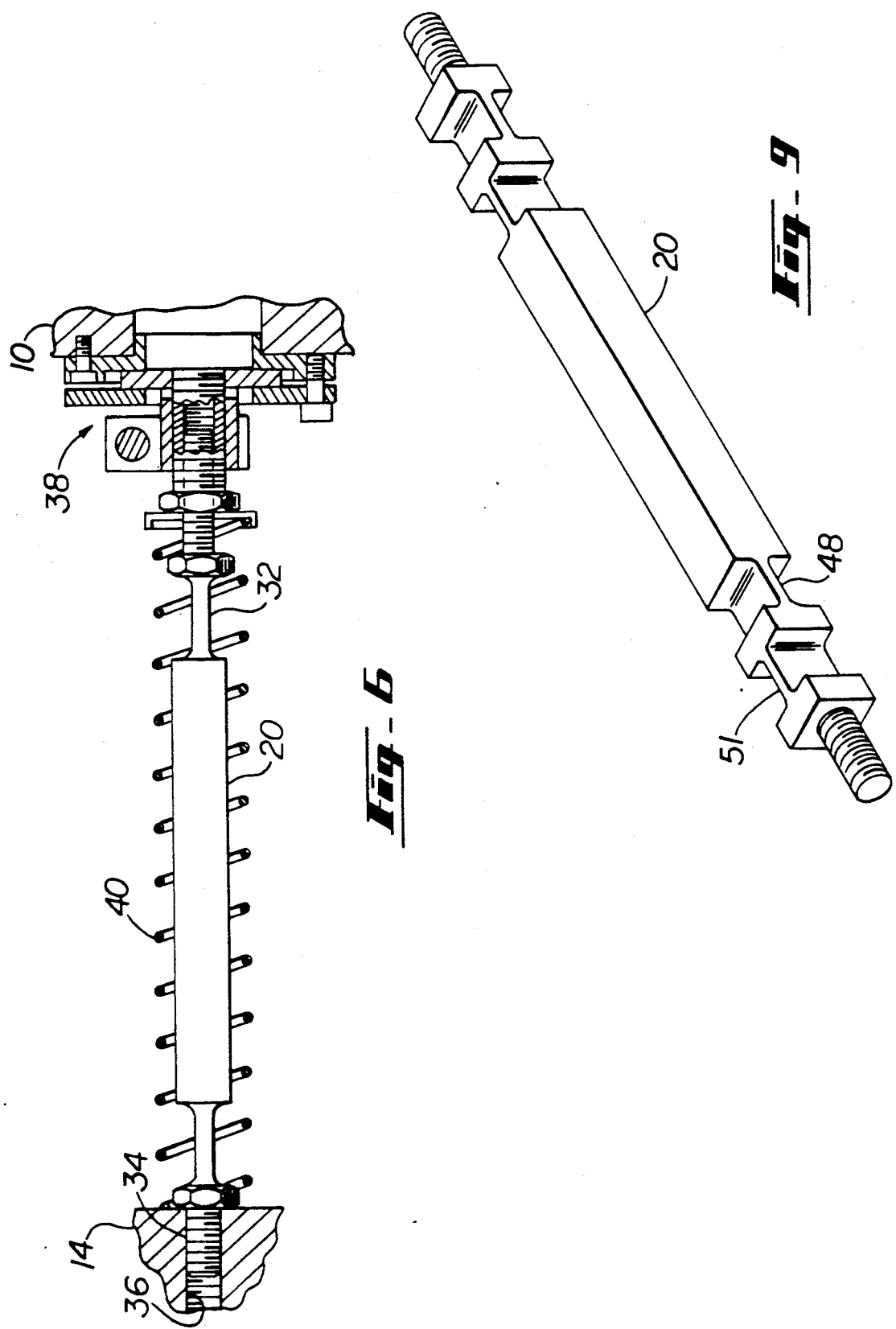

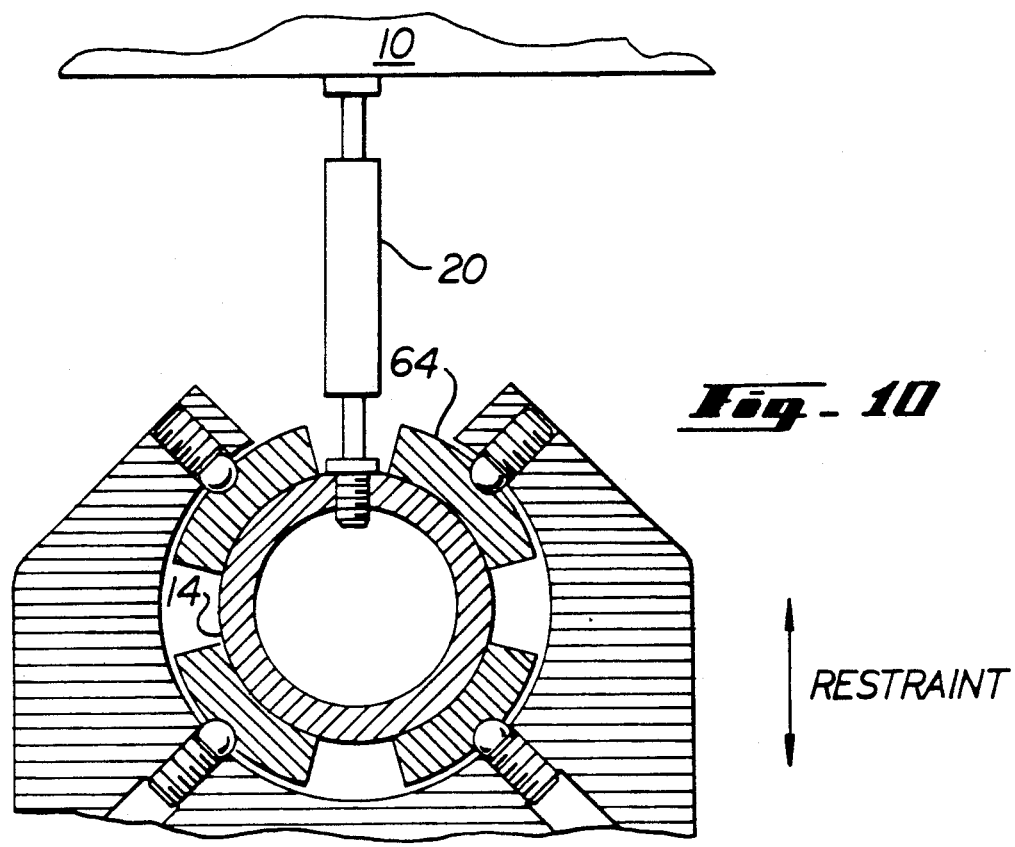
*Fig_10*
RESTRAINT
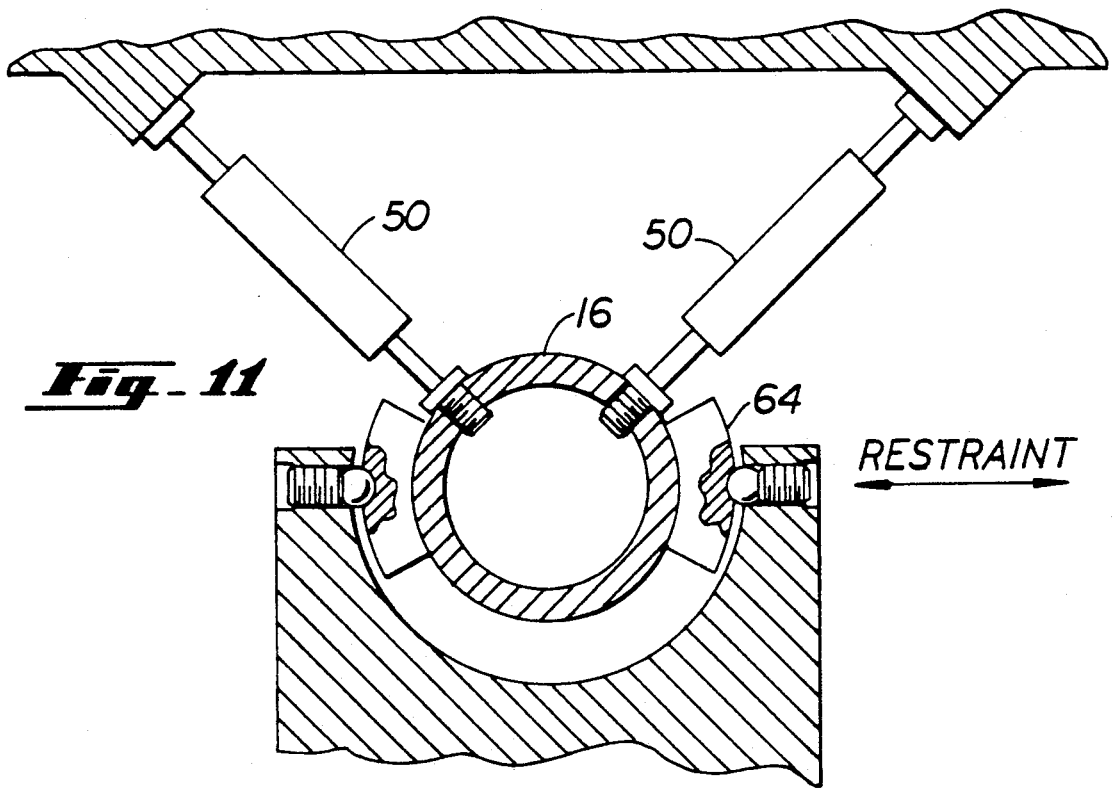
*Fig_11*
RESTRAINT

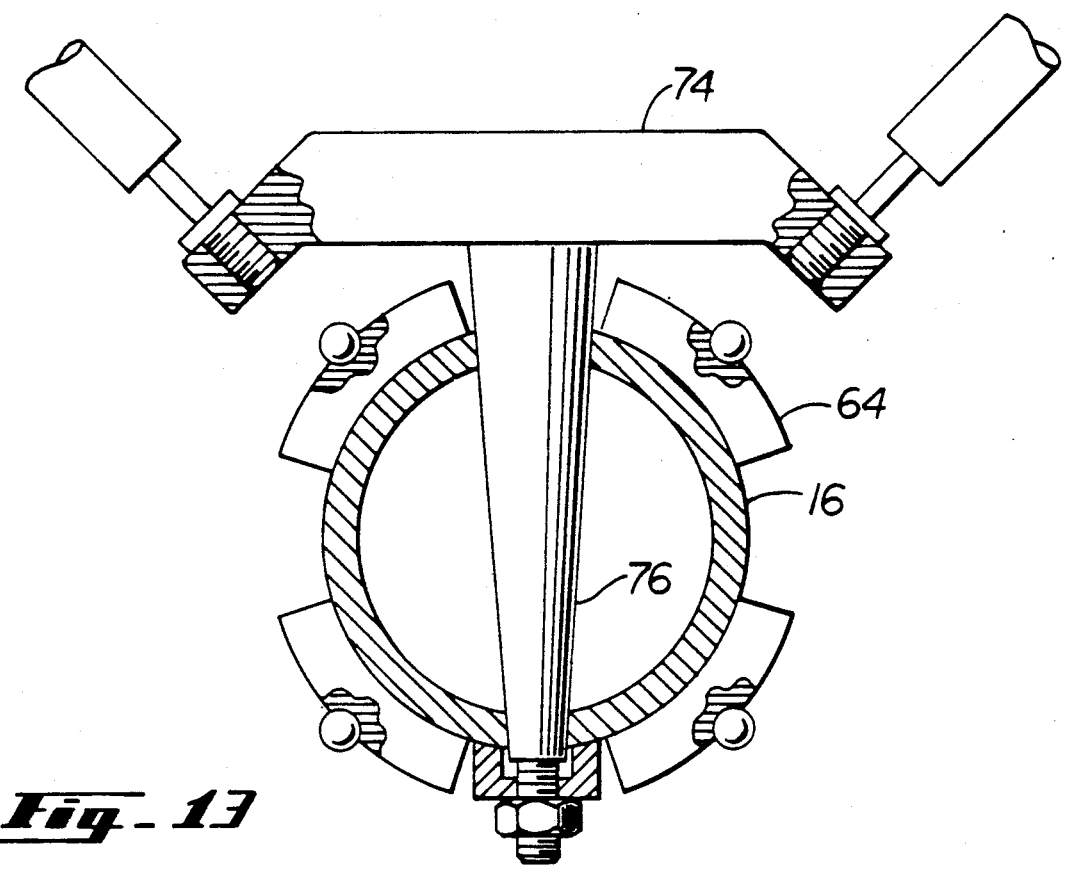
Fig_13
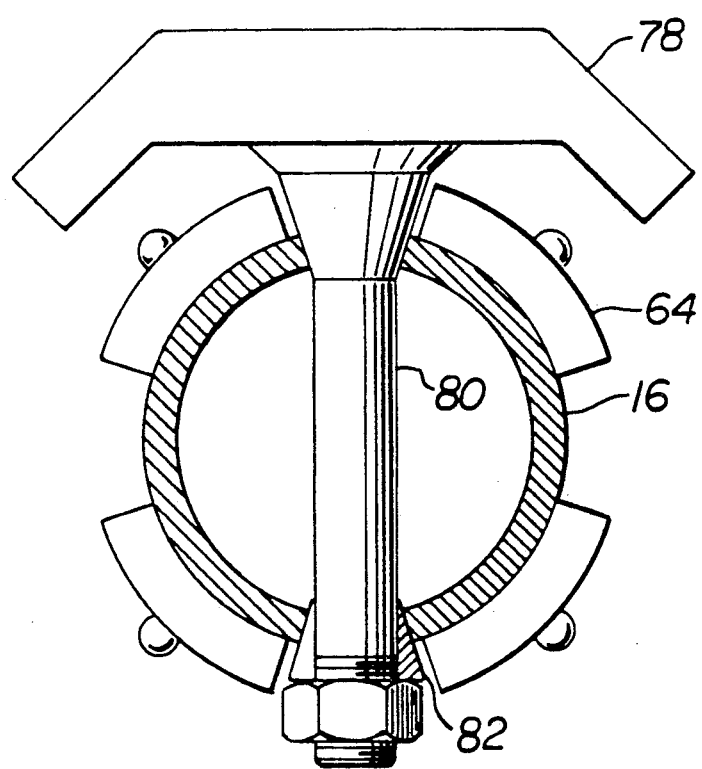
Fig_14

LINEAR GUIDING APPARATUS

This invention relates to apparatus for guiding movement of a component and is particularly but not exclusively concerned with high accuracy measuring and checking machines to maintain accurate relative movement between elements thereof.

Heretofore for purposes of accuracy, it has been necessary to construct co-ordinate measuring machines using heavyweight material such as granite, i.e. material which remains as stable as possible with variations in temperature, in order that guideways of the machine do not distort and thereby detract from the accuracy of measurement. It has not been practical to use lightweight structures supporting guideways components of granite or a like material as the different coefficients of thermal expansion of the materials again leads to distortion and loss of accuracy.

According to the present invention there is provided apparatus for guiding movement of a component, said apparatus comprising a support structure, elongate guide means on which the component is adapted to be mounted by bearing means for movement therealong, characterised in that means connect the guide means in an outwardly spaced relation to the support structure, the connecting means being adapted to accommodate relative movement between the guide means and the support structure in the direction of axis of the guide means but to remain accurately positioned in all directions normal to the axis of the guide means.

Preferably the guide means comprises a plurality of guide members mounted in a parallel spaced apart relation outwardly of a guiding face of the support structure.

Preferably also the connection means comprises a plurality of elongate members mounting the guide means on the support structure, at least one hinge being provided on each elongate member to accommodate the relative movement. The hinge may have a reduced thickness relative to the elongate member and may be formed as a planar web or have a cylindrical or prismoidal form. The hinge may be integrally formed or be in the form of a wire which can be separately formed from the elongate member.

The connection means may comprise pairs of elongate members mounting the guide means on the support structure, with the elongate members of each pair preferably in a spaced angular relation, for example 90° apart. Each pair of elongate members may be mounted on a bracket which fixedly mounts the guide means.

The or each elongate connecting member may be adjustable along its axis in a preferred arrangement the guide members are of tubular cylindrical form and the elongate connecting members are positioned radially with respect to the guide members.

The invention also provides a co-ordinate measuring machine having apparatus as described in any of the five preceding paragraphs for guiding a respective component along at least one of the co-ordinate axes.

An embodiment of the present invention will now be described by way of example only with reference to the accompanying drawings, in which: FIG. 1 is a schematic representation of a linear guideways on a column of a co-ordinate measuring machine, the carriage to be supported by the guideways for movement along the column having been omitted for clarity;

FIG. 4 is a part view showing one example of the connection arrangement for a component of the guideway;

FIG 5 is a part view similar to FIG. 4 showing another example of the connection arrangement;

FIG. 6 is a part view similar to FIGS. 4 and 5 showing a further example of the connection arrangement;

FIG. 9 is a perspective view of a still further example of the component of the guideway;

FIG. 10 is a schematic plan view in section of a single guideways element and its mounting on a carriage;

FIG 11 is a plan view similar to FIG. 10 showing another single guideways element and the mounting of a carriage thereon; and FIGS. 12 to 15 illustrate schematically different variations for connecting components of the guideway to the guideway elements.

In a three axis co-ordinate measuring machine, a linear guideway is provided for movement of a respective component along each respective axis. In one example of such a machine one guideway is formed on the base for movement therealong of a carriage which supports a column, and the column has another guideway for movement therealong of the carriage which in turn has a further guideway to accommodate movement of a quill, the latter mounting a probe for contact with a workpiece.

Figure 1:
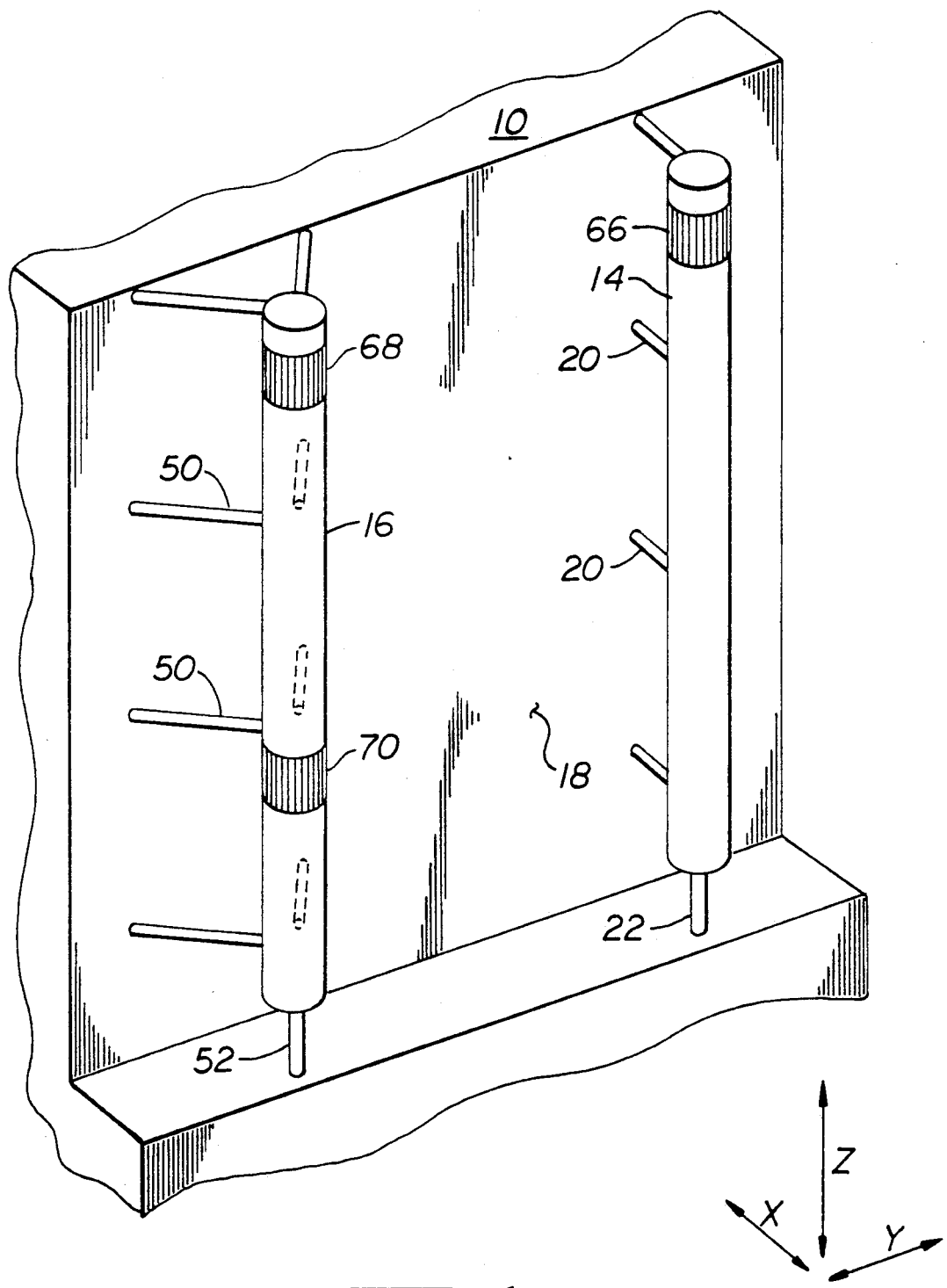
Figure 2:
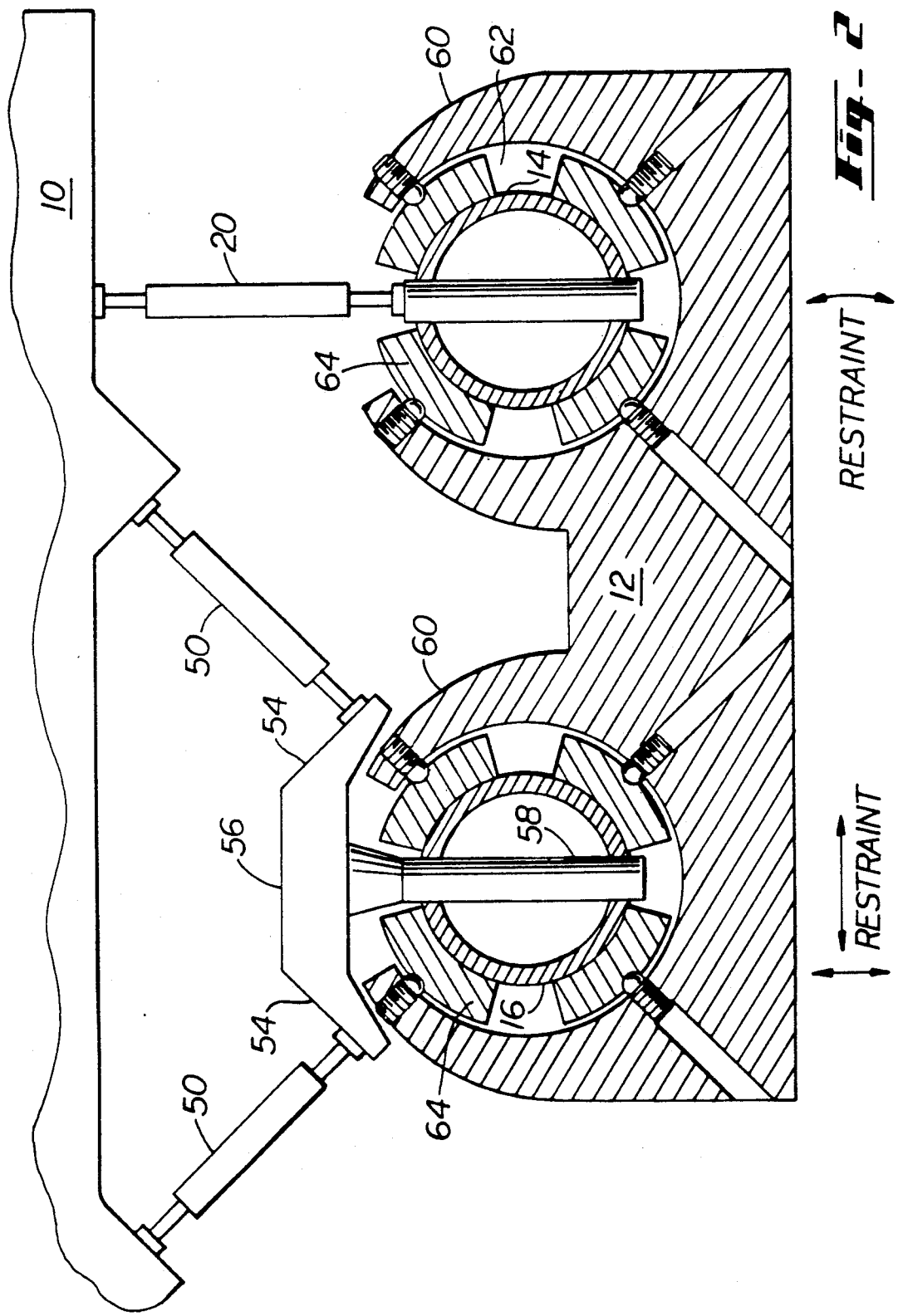
FIG. 2 is a schematic sectional plan view of a similar linear guideways but showing more detail of construction and showing the guideways supporting the carriage.

Referring to FIGS. 1 and 2 of the drawings, there is shown a column 10 of a co-ordinate measuring machine adapted to mount a carriage 12 (FIG. 2) for movement therealong.

The linear guideway providing for such movement comprises two tubular guides 14,16 mounted on a guiding face 18 of the column 10 outwardly thereof in a parallel spaced apart relation and extending in a direction parallel to the longitudinal axis of the column 10. The guides 14,16 each have a circular cross section and are preferably formed of a ceramic material but alternatively may be formed of other suitable materials such as stainless steel.

The guide 14 is mounted on the column 10 by a plurality of elongate bars 20 of circular cross-section spaced along the length of the guide 14, and preferably formed of steel, but alternatively formed of any other suitable material such as carbon fibre. The guide 14 is anchored at its lower end by an axially aligned anchor 22 of a similar construction to the elongate bars.

The guide 14 requires to be mounted on the column 10 in such a manner as to allow change in relative length, due for example to a change of temperature and different coefficients of thermal expansion between the material of the guide 14 and the column 10, to occur freely, but to retain the guide 14 in a rigid relation to the column 10 in a direction along the axis of each of the bars 20 perpendicular to the axis cf the guide 14. There also requires to be provided an arrangement for finely adjusting the connection between the guide 14 and the column 10 so as to accommodate lack of accuracy in the latter. Change in relative length may be provided for by allowing an arcuate movement of the guide 14 which closely approximates linear movement in the axial direction of the latter.

In one arrangement as shown in FIG. 4 the arcuate movement may be enabled by pivotally mounting each bar 20 between the guide 14 and the column 10. The bar 20 has a spherical pivot 22 at each end locating in respective recesses, and single acting bearings. A pair of tension springs 24 are provided to extend between the guide 14 and the column 10 to maintain the pivots 22 in contact with the bearings. Other arrangements may be provided to maintain the pivots in contact with the bearings, and the spherical pivots may be replaced by crossed cylinders. The distance between the pivots is selected so that the departure from a straight line over the working displacement is acceptable.

In an alternative arrangement as shown in FIG. 5, each bar 20 is mounted by way of a spherical, self-aligning rolling element bearing 26 on a fixed pin 28, and a compression spring 30 extends between the guide and the column to remove play from the bearings and to increase the bearing stiffness. Tension springs or other arrangements may be provided instead of the compression spring 30.

The bar 20 in each of the arrangements of FIGS. 4 and 5 incorporates a fine pitch screw thread adjustment to the length of the bar.

In a further possible example as shown in FIG. 6, each of the bars 20 has a section of reduced thickness at each end effectively forming a bi-directional elastic or plastic integral hinge 32, preferably having a cylindrical form. As an alternative the hinges 32 may be formed as a separate piece clamped to the bar 20. At one end each bar 20 has an externally threaded section 34 for location in a radially extending threaded hole 36 in the guide 14, whereby the axis of the bar 20 is radial with respect to the guide 14. At its other end the bar 20 is connected through a mounting arrangement 38 which enables adjustment of the bar 20 relative to the guiding face 18 for a purpose hereinafter described. The arrangement 38 enables accurate location of the bar 20 perpendicular to the axis of the guide 14, providing for both an initial coarse adjustment and subsequent fine adjustment by way of a differential thread. To avoid crippling or buckling of the hinges 32 when the bar 20 is used as a strut, a compression spring 40 is used to reduce the compressive force on the bar 20 or to convert the compressive force to a tensile force.

Figure 7:
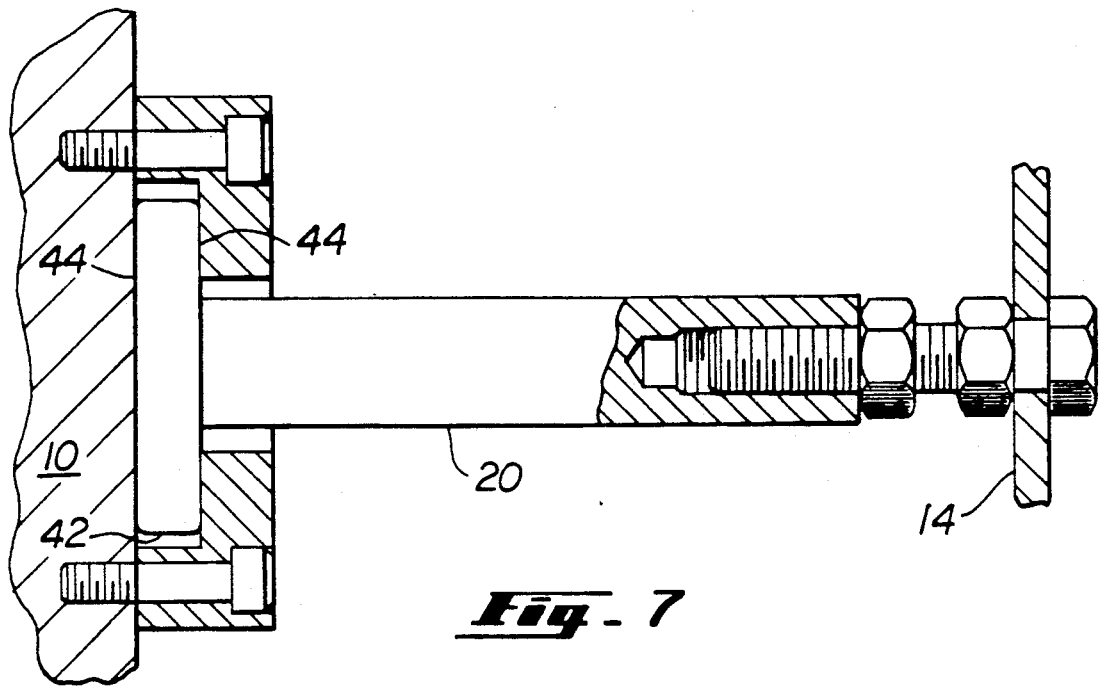
FIG. 7 is a part view similar to FIGS 4 to 6 showing another example of the connection arrangement.
Figure 8:
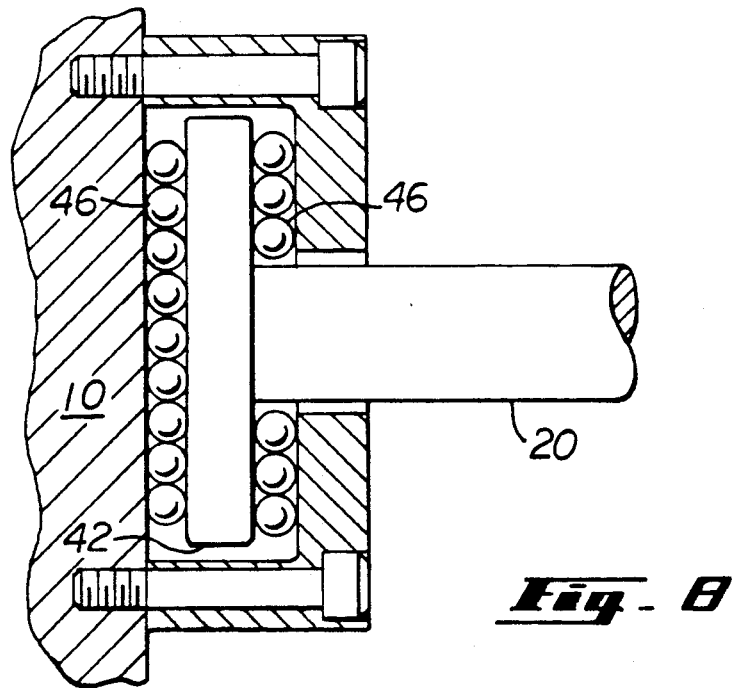
FIG. 8 is a part view similar to FIGS. 4 to 7 showing yet another example of the connection arrangement.

To enable change of relative length between the guide 14 and the column 10 by way of linear movement in the direction of the change of length, linear bearings can be provided. These bearings may be air bearings or hydrostatic bearings as shown in FIG. 7 where a bearing part 42 locates between bearing surfaces 44 to mount the bar 20 on the column 10. Alternatively the bearings may be rolling element bearings 46 as shown in FIG. 8. Such bearings may be single acting, i e. capable of resisting forces in one direction only, so that further arrangements may be necessary to ensure that the bearing surfaces are maintained in contact and to increase the bearing stiffness. Alternatively the bearings may be double acting, i.e. capable of resisting forces in two opposed directions, in which case similar additional arrangements may be used to remove any play from the bearings and to increase the bearing stiffness. Tho bearings shown in FIGS. 7 and 8 are capable of moving in two mutually perpendicular directions in a plane in order to reduce the degree of accuracy necessary, and to allow the fine adjustments in two mutually perpendicular directions to take place without introducing stress and strain.

In a further design of the bar 20, each end of the bar 20 may be formed with two sections 48,51 of reduced thickness, each forming a mono-directional elastic or plastic hinge, enabling the change in relative length by arcuate movements (FIG. 9).

The guide 16 is formed of the same material as the guide 14 and is mounted on the column 10 by a plurality of pairs of bars 50 of the same chosen construction of the bar 20, the pairs being spaced along the length of the guide 16. The bars 50 are each secured at one end radially to the guide 16 but are angularly spaced by 90°, each of the bars 50 at its other end being connected to the column 10 by way of a mounting arrangement which enables adjustment of the bar 50 relative to the guiding face 18. The guide 16 is also anchored at one respective end by an anchor 52.

As shown in FIG. 2, it is preferred that each pair of the bars 50 is mounted on opposed arms 54 of a T-shaped element 56, a leg 58 of the latter passing through two diametrically opposed holes in the guide 16 and being fixed thereto by means of adhesive, solder, brazing metal or by welding.

The carriage 12 (FIG. 2) is formed with a pair of guide lugs 60, each presenting an open channel 62 of circular configuration facing the guiding face 18 and so dimensioned that the lug 60 can substantially surround a respective one of the guides 14,16 and be slidably mounted thereon by means of angularly spaced bearings 64. One bearing arrangement 66 (FIG. 1) is provided for the guide 14 and two longitudinally spaced bearing arrangements 68,70 are provided for the guide 16. The bearings may be for example air bearings, linear rolling bearings, hydrostatic bearings, hydrodynamic bearings, boundary lubricated bearings, or dry lubricated bearings. The carriage 12 moving in such a guideways requires five degrees of restraint and one degree of freedom, in this instance in the axial direction of the guides 14,16. The guide 16 offers two degrees of restraint to the bearing arrangement 68 and the guide 14 offers one degree of restraint to the bearing arrangement 66, but this, in conjunction with the guide 16, controls rotation about the axis of the guide 16. The bearing arrangement 70 controls rotation about the other two axes making five restraints in total.

When setting up the machine, the bars 20,50 may be finely adjusted along their axes to provide for straightness of the guideways. In use, the bars are sufficiently compliant transversely of their axes to accommodate movement due to differential thermal expansion between the guideways and the material of the column 10, but the bars remain sufficiently stiff axially so as to support forces imposed on the guideways without buckling, or straining beyond the tolerance permitted by the required guideways accuracy. The bars also accommodate adjustment during the initial alignment and prevent significant stress or strain being incurred by either the guideway or the supporting column.

The guideway thereby remains accurately located in all directions normal to the guideway axis. The bars 20,50 are aligned to transmit the guideway forces in pure tension or compression and may be in one plane, two mutually perpendicular planes, or three mutually perpendicular planes or directions. In the preferred form where the guides are cylindrical, the bearing forces are always radial and the lines of action pass through the centre of the guides 14,16.

Different arrangements of support for a guideway on a structure may be provided. For example in FIG. 10 there is shown a guideway comprising a single guide 14 having four bearings 64 and a single row of bars 20 giving only one restraint. A guideway as shown in FIG. 11 comprises a single guide 16 with only two bearings 64 and two rows of bars 50, again giving restraint in one direction only. To obtain two mutually perpendicular restraints it is necessary to have at least three and preferably four bearings and two rows of bars. To prevent interference between the bars and the carriage lugs, the bars can be connected to T-shaped elements such as the element 56. For correct location the axes of the bars must intersect at the centre of the guide. The T-shaped element must be capable of transmitting moments about the guideway axis to the guideway and so must be rigidly fixed to the guide.

The FIG. 11 arrangement approximates to a four bar link with four pivots. Because the pivots have a finite stiffness, a significant moment about the axis of the guide 16 is required to displace the bars and usually there is no such moment applied. Because of necessary tolerances in manufacture a small moment may be applied and cause a small deflection of the centre of the guide. To avoid this possibility, one of the hinges in the bars can be changed from a bi-directional hinge to a uni-directional hinge, leaving three hinges in the plane normal to the guideway axis. The structure then approximates to a rigid triangulated pin jointed structure which is determinate. In the guideway axial plane there are still two hinges to allow differential thermal expansion to take place with minimum restraint.

Figure 12:
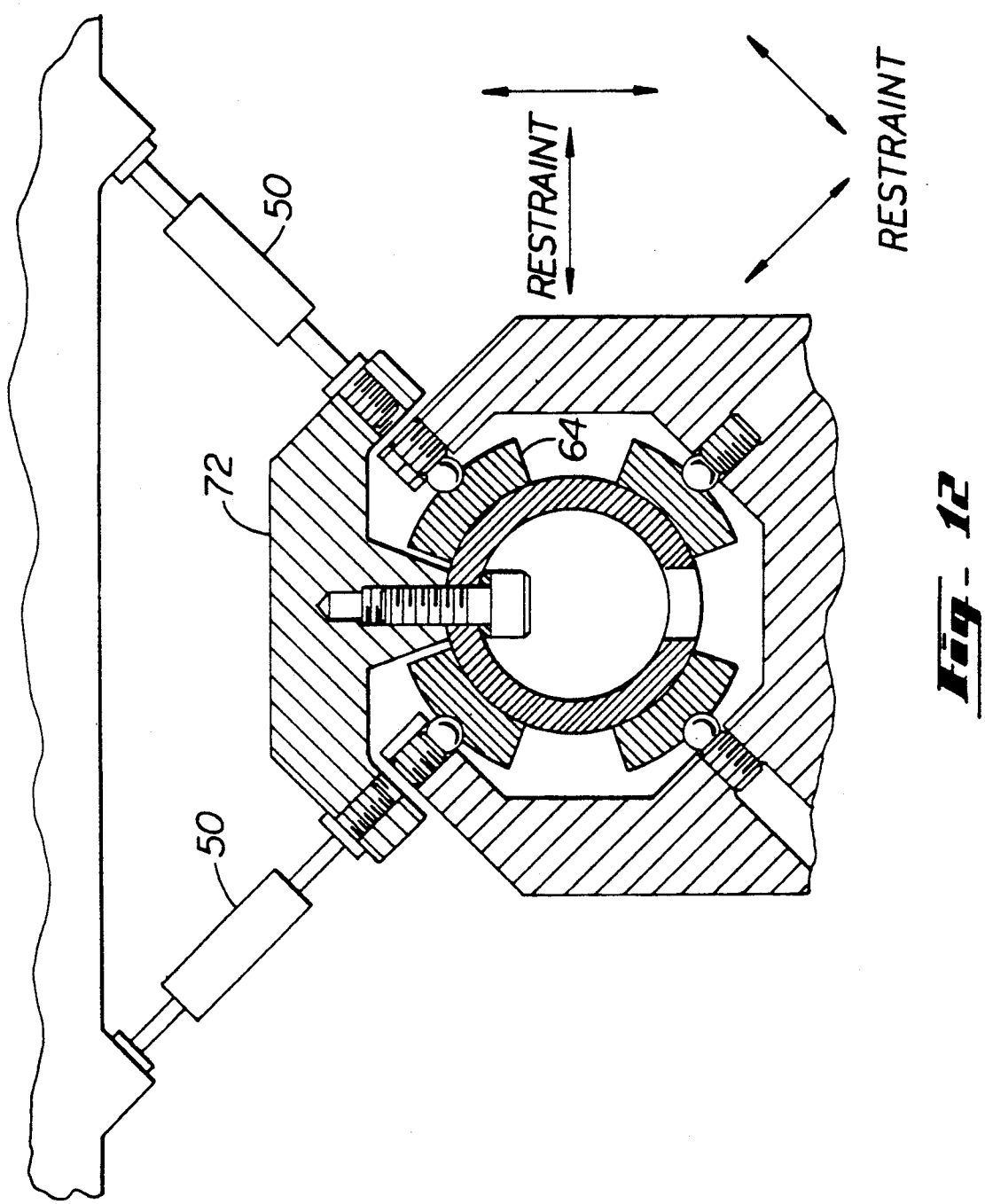
Figure 15:
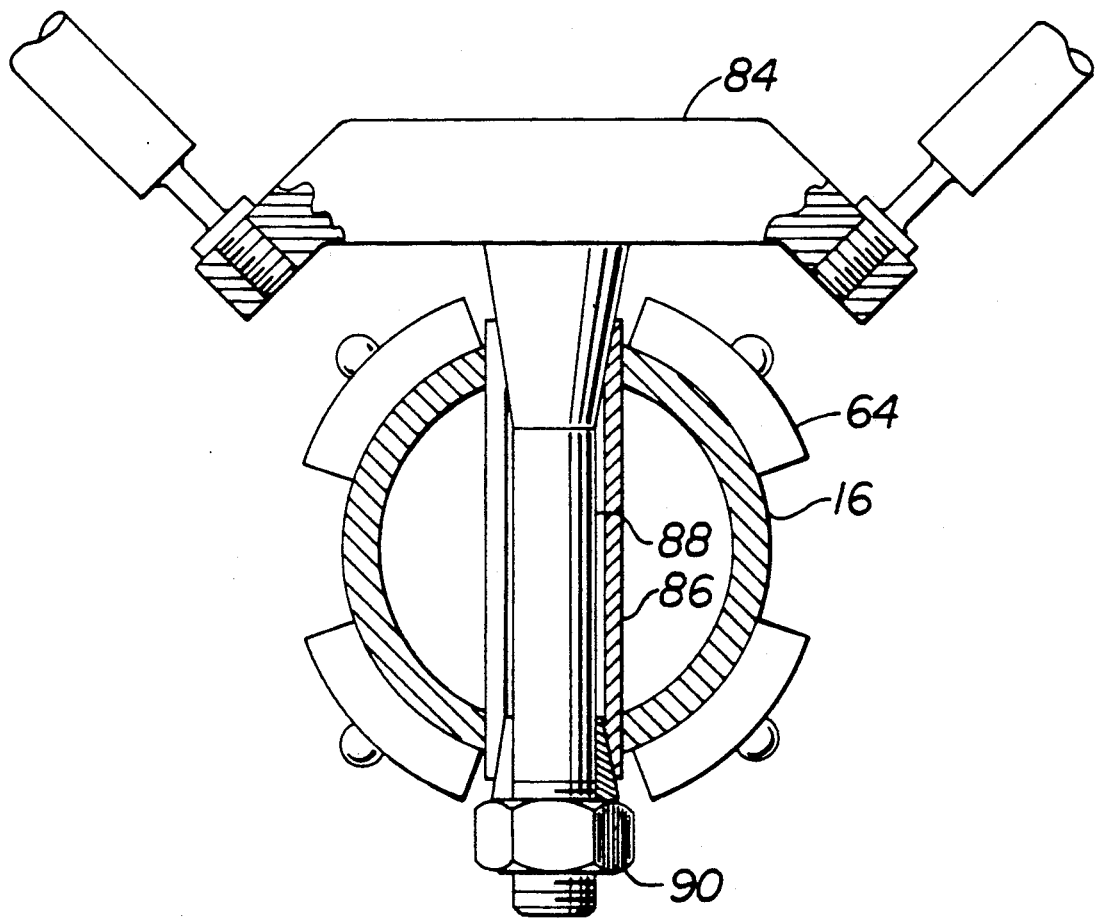

Variations of the design of T-shaped element are shown in FIGS. 12 to 15. In FIG. 12 a T element 72 has a V formation for mounting on the guide 16. The elements 72 may be individual to each pair of bars 50 or may be in the form of a single element extending along a length of the guideway. A T element 74 (FIG. 13) is clamped by a conical tapered stem 76 in two matching tapered holes in the guide 16. A T element 78 (FIG. 14) has a tapered stem 80 in a tapered hole with a split conical sleeve 82 in a tapered hole at the other side of the guide 16. Finally a T element 84 (FIG. 15) has a split sleeve 86 interposed between a stem 88 and the guide 16 to prevent transmission of compressive forces from a securing nut 90 which may otherwise deform the guideway.

Figure 3:
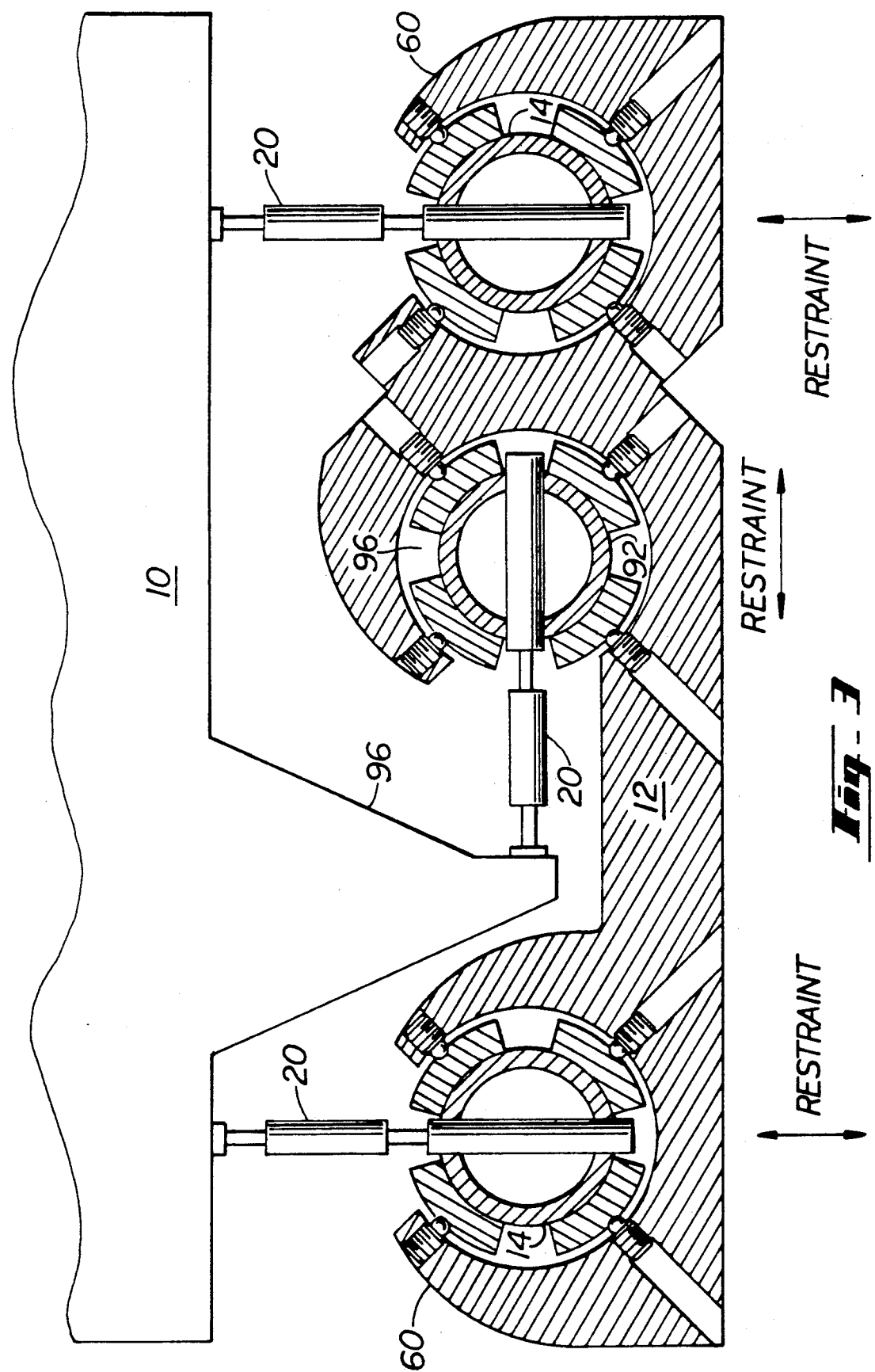
FIG. 3 is a schematic plan view similar to FIG. 2 but showing another guideways and carriage arrangement.

An alternative guideway configuration is shown in FIG. 3 where a pair of guides 14 are located on respective sides of a further guide 92. The latter is located within a further open channel 94 of circular configuration formed in one of the guide lugs 60, the channel 94 opening towards the other of the guide lugs 60. The guide 92 is supported on a projecting part 96 of the column 10 by a bar 20, and this arrangement of three guides provides the five degrees of restraint for the guideway without using T elements.

Such a linear guideway can be used in any or all axes of a co-ordinate measuring machine. The use of such a linear guideway enables the use of other than heavyweight materials as the supporting structures, because differential thermal expansion between the different materials can be accommodated. Therefore the guideway is suitable for fitting to a supporting structure of any material and any degree of accuracy. The guides may have any shape in cross-section, including any polygon with straight or curved sides.

The elastic or plastic hinges incorporated in the bars may take any of a number of forms other than that described and shown. For example the hinges may be formed as integral planar webs, or may take the form of integral wires, or may be formed as separate wires connecting different sections of the bars.

Further the guides may be anchored by other than the axial arrangements at one end, for example by anchoring stays, possibly angled, at an appropriate location along the lengths of the guides and extending between the guides and the column.

Various other modifications may be made without departing from the invention. For example the design of carriage may differ from that described and shown. Also it will be appreciated that the invention may be utilized in other than measuring and checking machines.

The guideway apparatus is advantageously used in a measuring machine together with a base guideway structure of the type described in our co-pending U.K. application No. 8808281 entitled "Support Structures" and having a floor support as described in our co-pending U.K. application No. 8808282 entitled "Support Assemblies". Also such a machine can have a lightweight structure for other components as described in our co-pending U.K. application No. 8808280 entitled "Machine Structure".

I claim:

1. Apparatus for guiding movement of a component, said apparatus comprising a support structure, elongate guide means on which the component is adapted to be mounted by bearing means for movement therealong, characterised in that means (20,50) connect the guide means (14,16) in an outwardly spaced relation to the support structure (10), the connecting means (20,50) being adapted to accommodate relative movement between the guide means (14,16) and the support structure (10) in the direction of the axis of the guide means (14,16) but to remain accurately positioned in all directions normal to the axis of the guide means (14,16).

2. Apparatus according to claim 1, characterised in that the guide means comprises a plurality of guide members (14,16) mounted in a parallel spaced apart relation outwardly of a guiding face (18) of the support structure (10).

3. Apparatus according to claim 1 or 2, characterised in that the connecting means comprises a plurality of elongate members (20,50) mounting the guide means (14,16) on the support structure (10), at least one hinge being provided on each elongate member (20,50) to accommodate the relative 4. Apparatus according to claim 3, characterised in that the hinge has a reduced thickness relative to the elongate member.

5. Apparatus according to claim 4, characterised in that the hinge is formed as a planar web.

6. Apparatus according to claim 4, characterised in that the hinge is cylindrical.

7. Apparatus according to claim 4, characterised in that the hinge is integrally formed on the elongate member.

8. Apparatus according to claim 3, characterised in that the hinge has the form of a wire.

9. Apparatus according to claim 8, characterised in that the wire is separately formed from the elongate member.

10. Apparatus according to claim 1 or 2, characterised in that the connection means comprises a plurality of elongate members (14,16) mounting the guide means on the support structure, bearings (66-70) being provided for the mounting of each elongate member (14,16) to accommodate the relative movement.

11. Apparatus according to claim 3 characterised in that the connection means comprises pairs of elongate members (50) mounting the guide means on the support structure 12. Apparatus according to claim 11, characterised In that the elongate members (50) of each pair are in a spaced angular relation.

13. Apparatus according to claim 12, characterised in that the pair of elongate members (50) are 90° apart.

14. Apparatus according to claim 11, characterised in that the pair of elongate members (50) are mounted on a bracket which fixedly mounts the guide means.

15. Apparatus according to claim 3, characterised in that the or each elongate connecting member (20,50) is adjustable along its axis.

16. Apparatus according to claim 4, when dependent on claim 2, characterised in that the guide members (14,16) each have a cylindrical form.

17. Apparatus according to claim 16, characterised in that the elongate connecting members (20,50) are positioned radially with respect to the guide members (14,16).

* * * * *